UNITED STATES PATENT OFFICE.

PHILIPP OTT, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

AZIN DYE AND PROCESS OF MAKING SAME.

940,354.  Specification of Letters Patent.  Patented Nov. 16, 1909.

No Drawing.  Application filed October 15, 1908.  Serial No. 457,849.

*To all whom it may concern:*

Be it known that I, PHILIPP OTT, doctor of philosophy, chemist, citizen of the German Empire, residing at Leverkusen, near Cologne, Germany, Kingdom of Prussia, have invented new and useful Improvements in Azin Dyes and Processes of Making Same, of which the following is a specification.

I have found that azin dyestuffs can be prepared in a very simple manner and with an almost quantitative yield by joint oxidation of paradiamins or their substitution products with at least one free amino group and arylated 1.3-naphthylene diamins or their substitution products or derivatives thereof *e. g.* the sulfonic acids, in the presence of small quantities of ammoniacal cupric oxid by means of oxygen or air. The reaction is probably due to a catalytic action of the cupric oxid ammonia. The copper is used in such small quantities that it is not necessary to remove it from the dyes. Any paradiamins, *e. g.* para-phenylene diamin or its sulfonic or carboxylic acids, 1.4-naphthylene diamin, or any substituted para-diamins having a free amino group may be used, *e. g.* aminoarylanilins, aminodiphenylamins, etc.

For the production of my new azin dyes I prefer to oxidize aminodiphenylamin compounds or their derivatives with at least one free amino group *e. g.* para-aminodiphenylamin, para-para$_1$-diaminodiphenylamin sulfonic acids, para-amino-diphenylamin monoacetyl-para-para$_1$-diaminodiphenylamin sulfonic acid, para-methoxy-para$_1$-aminodiphenylamin sulfonic acid, ortho-methoxy-para$_1$-aminodiphenylamin sulfonic acid etc. together with mono-sulfonic acids of arylated 1.3-naphthylene diamins or their derivatives, *e. g.* diphenyl-1.3-naphthylenediamin-5- or 8-sulfonic acids, ditolylsulfonic acids etc.

The new dyestuffs are dark powders soluble in water with from a violet to blue color, soluble in concentrated sulfuric acid and dyeing wool from acid baths from violet to blue shades.

In order to illustrate the new process more fully the following examples are given, the parts being by weight:

*Example 1.*—39 parts of diphenyl-1.3-naphthylenediamin-8-sulfonic acid and 29.4 parts of para-amino-ortho$_1$-methoxyaminodiphenylamin sulfonic acid are dissolved in a mixture of about 300 parts of alcohol and 300 parts of water with 20 parts of sodium carbonate. 5 parts of a concentrated solution of an ammoniacal solution of copper sulfate (containing about 2 parts of crystallized copper sulfate) are added. The mixture is then heated to from 30–50° C. and air is passed through it until the diphenylnaphthylenediamin sulfonic acid has completely disappeared. The dyestuff separates frequently during cooling; if not it is precipitated by the addition of common salt. It is after being dried and pulverized a brown powder soluble in water with a blue color and soluble in concentrated sulfuric acid with a green color. It dyes wool from acid baths pure blue shades.

*Example 2.*—39 parts of diphenyl-1.3-naphthylenediamin-5-sulfonic acid and 26.4 parts of para-aminodiphenylamino-ortho-sulfonic acid are dissolved in a mixture of about 300 parts of alcohol and in 300 parts of water with 20 parts of sodium carbonate. After the addition of 5 parts of a concentrated ammoniacal solution of copper sulfate the mixture is heated to from 30–50° C. and a current of air is passed through it until the diphenylnaphthylenediamin sulfonic acid has completely disappeared. The dyestuff separates almost completely during cooling. It is filtered off and dried. It dyes wool violet shades.

*Example 3.*—39 parts of diphenyl-1.3-naphthylenediamin-8-sulfonic acid and 26.4 parts of para-amino-diphenylamino-ortho sulfonic acid are dissolved in alcohol and water. 5 parts of a concentrated ammoniacal solution of copper sulfate are added and the solution is heated to from 30–50° C. A current of air is then passed through until the quantity of the dyestuff formed does not increase any more. The dyestuff which separates on cooling is filtered off and dried. It dyes wool from acid baths reddish blue shades. The dyestuffs can also be obtained by starting *e. g.* from diaryl-1.3-naphthylenediamin and sulfonating the azins thus produced.

*Example 4.*—31 parts of diphenyl-1.3-naphthylenediamin and 18.3 parts of para-aminodiphenylamin are dissolved in 300 parts of alcohol. 5 parts of a concentrated ammoniacal solution of copper sulfate are added. The mixture is then heated to from 30–50° C. and a slow current of air is passed through it until the diphenylnaphthylenediamin has completely disappeared. Most of the dyestuff crystallizes during cooling. It is completely separated by the addition of common salt. Its hydrochlorid dyes cotton mordanted with tannin violet shades.

To render it suitable for dyeing wool the dyestuff is converted in the usual way into a soluble sulfo compound by treatment with fuming sulfuric acid. The sulfonic acid thus prepared dyes wool violet shades.

Other para-diamins or other naphthylenediamins can be used.

Having now particularly described and ascertained the nature of my invention and in what manner the same is to be performed, I declare that what I claim is:—

1. The process for producing dyestuffs of the azin series, which procss consists in oxidizing in the presence of ammoniacal cupric oxid by means of oxygen, as hereinbefore defined, paradiamins and arylated 1.3-naphthylenediamins, substantially as described.

2. The process for producing dyestuffs of the azin series, which process consists in oxidizing in the presence of ammoniacal cupric oxid by means of oxygen, as hereinbefore defined, substitution products of paradiamins with at least one free amino group and arylated 1.3-naphthylenediamins, substantially as described.

3. The process for producing dyestuffs of the azin series, which process consists in oxidizing in the presence of ammoniacal cupric oxid by means of oxygen, as hereinbefore defined para-diamins and sulfonic acids of arylated 1.3-naphthylenediamins, substantially as described.

4. The process for producing dyestuffs of the azin series, which process consists in oxidizing in the presence of ammoniacal cupric oxid by means of oxygen, as hereinbefore defined, substitution products of paradiamins with at least one free amino group and sulfonic acids of arylated 1.3-naphthylenediamins, substantially as described.

5. The process for producing new dyestuffs of the azin series, which process consists in oxidizing in the presence of ammoniacal cupric oxid by means of oxygen, as hereinbefore defined, aminodiphenylamin compounds with at least one free amino group and monosulfonic acids of arylated 1.3-naphthylenediamins, substantially as described.

6. The process for producing a new dyestuff of the azin series, which process consists in oxidizing in the presence of ammoniacal cupric oxid by means of oxygen, as hereinbefore defined, para-amino-ortho$_1$-methoxyaminodiphenylamin sulfonic acid and diphenyl-1.3-naphthylenediamin-8-sulfonic acid, substantially as described.

7. The process for producing dyestuffs of the azin series, which process consists in oxidizing in the presence of ammoniacal cupric axid by means of oxygen, as hereinbefore defined, para-diamins and arylated 1.3-naphthylenediamins and treating these compounds with sulfonating agents, substantially as described.

8. The herein-described new dyestuffs of the azin series obtainable from arylated 1.3-naphthylenediamin monosulfonic acids and aminodiphenylamino compounds with at least one free amino group, which dyestuffs are dark powders soluble in water with from a violet to blue color and soluble in concentrated sulfuric acid, and dyeing wool from acid baths from violet to blue shades, substantially as described.

9. The herein-described new dyestuff of the azin series, obtainable from diphenyl-1.3-naphthylenediamin-8-sulfonic acid and para-amino-ortho$_1$-methoxyaminodiphenlyamin sulfonic acid, which dyestuff is after being dried and pulverized a brown powder soluble in water with a blue color, soluble in concentrated sulfuric acid with a green color and dyeing wool from acid baths pure blue shades, substantially as described.

In testimony whereof I have hereunto set my hand in the presence of two subscribing witnesses.

PHILIPP OTT. [L. S.]

Witnesses:
 OTTO KÖNIG,
 WM. WASHINGTON BRUNSWICK.